(12) United States Patent
Huang

(10) Patent No.: US 11,253,052 B2
(45) Date of Patent: Feb. 22, 2022

(54) ELECTRICAL TOOTHBRUSH HEAD IN SECURE CONTACT ENGAGEMENT WITH VIBRATION CORE

(71) Applicant: Jiang Huang, Pingxiang (CN)

(72) Inventor: Jiang Huang, Pingxiang (CN)

( * ) Notice: Subject to any disclaimer, the term of this patent is extended or adjusted under 35 U.S.C. 154(b) by 0 days.

(21) Appl. No.: 17/478,914

(22) Filed: Sep. 18, 2021

(65) Prior Publication Data
US 2022/0000253 A1    Jan. 6, 2022

(51) Int. Cl.
*A61C 17/22* (2006.01)
*A46B 5/00* (2006.01)
*A46B 9/04* (2006.01)
*A46B 13/02* (2006.01)
*A61C 17/34* (2006.01)

(52) U.S. Cl.
CPC ............. *A46B 5/0095* (2013.01); *A46B 9/04* (2013.01); *A46B 13/023* (2013.01); *A61C 17/3481* (2013.01)

(58) Field of Classification Search
CPC ....... A46B 5/0095; A46B 9/04; A46B 13/023; A61C 17/222; A61C 17/22
See application file for complete search history.

(56) References Cited

U.S. PATENT DOCUMENTS 11,071,613 B1 * 7/2021 Zhou ................. A46B 5/0095
2005/0108838 A1 * 5/2005 Schaefer ............. A61C 17/22
                                                          15/22.1

* cited by examiner

*Primary Examiner* — Shay Karls
(74) *Attorney, Agent, or Firm* — Andrew C. Cheng

(57) ABSTRACT

An electrical toothbrush head includes a toothbrush body and an insertion piece that includes a core channel and a sideway slot in which an elastic bar is arranged. The core channel has a contact engagement surface. The elastic bar has a curved section. When the vibration core is inserted into the core channel, the contact engagement surface and the curved section respectively contact and engage with core side surfaces of the vibration core, and the elastic bar is pushed to elastically deform away from the contact engagement surface. When the electrical toothbrush head and the toothbrush handle are combined, the vibration core is clamped between the contact engagement surface and the curved section and the elastic bar deforms outward and the elastic filler block is compressed, such that the elastic filler block and the elastic bar cause the curved section to be in elastic engagement with the vibration core.

10 Claims, 8 Drawing Sheets

ELECTRICAL TOOTHBRUSH HEAD IN SECURE CONTACT ENGAGEMENT WITH VIBRATION CORE

FIELD OF THE INVENTION

The present invention relates generally to the technical field of electrical toothbrushes, and more particularly to an electrical toothbrush head that is in secure contact engagement with a vibration core.

DESCRIPTION IF THE RELATED ART

With the continuous heightening of living standard, electrical toothbrushes have been gaining popularity in the market. An electrical toothbrush uses fast rotation or vibration of a vibration core to induce high frequency vibration in the brushing head of the toothbrush head by which tooth paste is instantaneously decomposed into fine foaming that goes deeply into gaps between teeth for cleaning. On the other hand, the vibration of the bristles helps enhance oral cavity blood circulation and also provide an effect of massaging to the gingival tissues.

An electrical toothbrush is made up of a toothbrush handle and a toothbrush head. The toothbrush handle includes a vibration core arranged at a top thereof. The toothbrush head is formed, in an interior thereof, with a core channel having a bottom opening. The toothbrush head is provided with bristles. The vibration core of the toothbrush handle is inserted, from bottom to top, into the core channel of the toothbrush head, and the vibration core is set in contact engagement with the core channel. In this way, high frequency vibration of the vibration core can drive the bristles of the toothbrush head to vibrate in order to achieve an effect of brushing teeth with the bristles.

In the known art, when the toothbrush handle is brought into mating engagement with the toothbrush head, the vibration core of the toothbrush handle is inserted into the core channel and direct contact engagement between the vibration core and an inside surface of the core channel help realize transmission of vibration. However, since the contact engagement between the vibration core and the inside surface of the core channel is in firm contact and the engagement may not be stable and secure so as to affect the transmission of vibration between the vibration core and the toothbrush head.

SUMMARY OF THE INVENTION

An objective of the present invention is to provide an electrical toothbrush head that is in firm contact engagement with a vibration core in order to overcome the problem that the contact engagement between the electrical toothbrush head and the vibration core is unsecure.

The present invention is implemented as follows. An electrical toothbrush head for being in secure contact engagement with a vibration core comprises a toothbrush body, the toothbrush body being provided, in a lower part thereof, with an insertion compartment that has a bottom opening, an insertion piece being inserted through the bottom opening and disposed in the insertion compartment, the insertion piece being provided, in a lower part thereof, with a core channel into which the vibration core in a flat form is insertable, the insertion piece being formed, in a bottom thereof, with an insertion opening in communication with the core channel;

the insertion piece being provided in a sidewall thereof with a sideway slot, the sideway slot penetrating to outside of the insertion piece and the core channel, an elastic bar that is integrally formed as one piece and elastically swingable being arranged in the sideway slot, the elastic bar being arranged to extend in an axial direction of the core channel, an upper end of the elastic bar being fixedly connected to the sidewall of the insertion piece, a lower end of the elastic bar being arranged in a movable manner;

the core channel having an inner surface that forms a contact engagement surface arranged to face the elastic bar, the contact engagement surface extending regularly and smoothly in an axial direction of the core channel, the elastic bar having a middle portion that bugles and curves toward the core channel to form a curved section, a contact engagement spacing being present between the curved section and the contact engagement surface, the contact engagement spacing being formed in a middle of the core channel, the contact engagement spacing being smaller than a thickness of the vibration core;

the vibration core including two core side surfaces that are opposite to each other, such that when the vibration core is inserted into the core channel through the insertion opening of the insertion piece, the vibration core extends through the contact engagement spacing to set the contact engagement surface in contact and pressing engagement with one of the core side surfaces of the vibration core, through surface engagement therebetween, another one of the core side surfaces of the vibration core being in contact and pressing engagement with the curved section and pushing the elastic bar to elastically deform away from the contact engagement surface; and an outside surface of the curved section surrounding and defining a curved trough, the curved trough being completely filled with a single-piece elastic filler block, the elastic filler block contacting and pressing an inside surface of the insertion compartment and being in a compressed state.

Further, the curved trough is provided therein with a constraint plate that is arranged horizontal, an inner end of the constraint plate being fixedly connected to a middle of the outside surface of the curved section, an outer end of the constraint plate extending toward an inside surface of the insertion compartment and forming a constraint spacing with respect to the inside surface of the insertion compartment, the elastic filler block covering and enclosing entirety of the constraint plate.

Further, the constraint plate divides the curved trough into two separation troughs that are respectively arranged at upper and lower sides, the elastic filler block filling up both of the two separation troughs, the constraint plate being formed with multiple penetration holes that extend longitudinally through the constraint plate, the elastic filler block filling up the multiple penetration holes.

Further, the separation troughs are provided therein with multiple horizontal pillars that are set horizontal, the multiple horizontal pillars being sequentially arranged at intervals in an axial direction of the core channel; the horizontal pillars have an inner end fixedly connected to the outside surface of the curved section, the horizontal pillars having an outer end extending toward the inside surface of the insertion compartment and being arranged to be spaced from the inside surface of the insertion compartment, the elastic filler block covering and enclosing the multiple horizontal pillars.

Further, the curved section has a curved side surface facing toward the contact engagement surface, a middle of the curved side surface being recessed in a direction away from the contact engagement surface to form a recessed groove, an interior of the recessed groove being filled up with a silicone rubber body; the curved side surface includes two planar pressing surfaces, the two planar pressing surfaces being respectively located on upper and lower sides of the recessed groove, the two planar pressing surfaces being each arranged in a manner of being flush with an outside surface of the silicone rubber body; when the vibration core is inserted into the core channel, the two planar pressing surfaces and the outside surface of the silicone rubber body are each contacting and pressing against the core side surface of the vibration core.

Further, the insertion piece includes a projection plate, the projection plate being arranged to extend in an axial direction of the core channel, the contact engagement surface of the core channel being formed on an inner side of the projection plate, the projection plate being formed with a hollow cavity that includes a bottom opening, the hollow cavity being arranged to extend in the axial direction of the core channel, the hollow cavity and the contact engagement surface being arranged to separate from each other.

Further, the elastic bar includes, in an upper part, a deformable section, an upper end of the deformable section being fixedly connected to a side wall of the insertion piece, a lower end of the deformable section being joined to the curved section; the deformable section includes an inside surface facing the core channel, the inside surface of the deformable section being a regular and smooth longitudinal surface, the deformable section including an outside surface facing the inside surface of the insertion compartment, the outside surface of the deformable section being of a curved recess facing toward the core channel.

Further, the insertion piece is provided, on an outside surface, with a planar section 119 in the form of a regular and smooth longitudinal surface, the planar section and the contact engagement surface being arranged opposite to each other, the planar section being arranged to extend in the axial direction of the core channel, a rib being formed on and raised from a middle portion of the planar section, the rib being arranged to extend in the axial direction of the core channel and spanning over entirety of the planar section.

Further, the insertion piece is provided, in an outside surface of an upper part thereof, with two retaining notches, the two retaining notches being arranged opposite to each other, the retaining notches having two ends horizontally extending through the insertion piece, the insertion compartment being provided with two retaining blocks raised from an inside surface thereof, the two retaining blocks being respectively insertable into the retaining notches.

Further, the insertion piece is provided, in an outside surface of a lower part thereof, with a circumferential groove, the circumferential groove being of a circumferential arrangement circling about the axial direction of the insertion piece, the insertion compartment being provided with multiple engagement projections raised from an inside surface thereof, the multiple engagement projections being sequentially and circumferentially arranged at intervals, the multiple engagement projections being insertable into the circumferential groove.

Compared to the known techniques, the present invention provides an electrical toothbrush head that can be set in secure contact engagement with a vibration core, wherein in combination with the toothbrush handle, the vibration core is inserted into the core channel, and the vibration core is clamped between the contact engagement surface and the curved section. Due to the elastic bar being deformed to swing outward, the elastic filler block is compressed. As such, the restoring forces of the elastic filler block and the elastic bar drive the curved section to elastically contact and press the vibration core, where the contacting and pressing is achieved in a secured and firm manner and allowing for elastic connection in cooperation with high frequency vibration of the vibration coreg.

DETAILED DESCRIPTION OF PREFERRED EMBODIMENTS OF THE INVENTION

Figure 1:
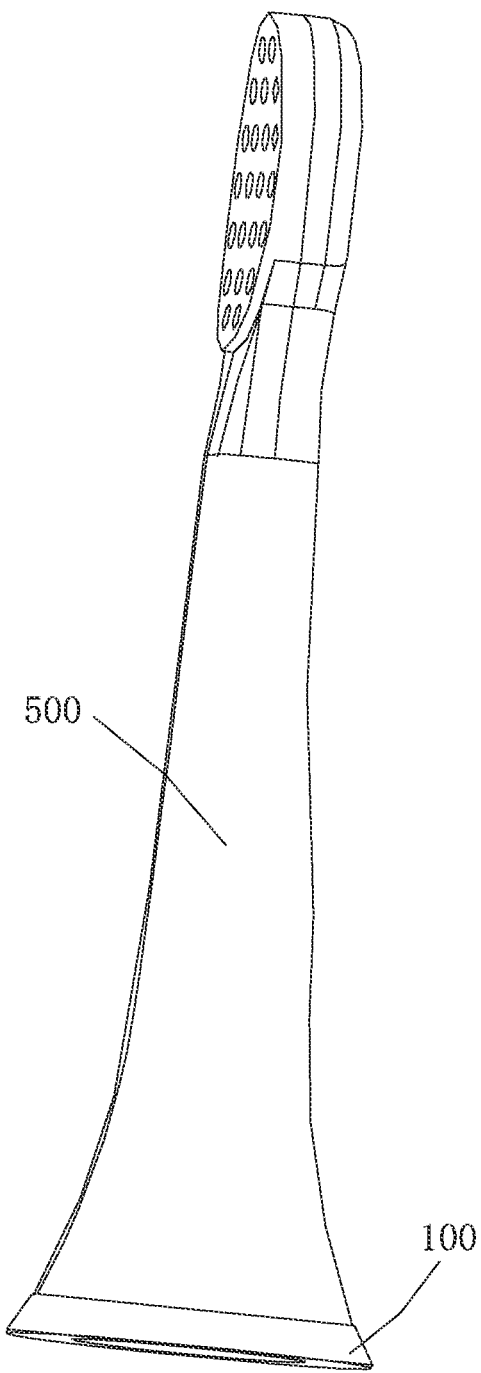
FIG. 1 is a perspective view showing an electrical toothbrush that can be set in secure contact engagement with a vibration core according to the present information.
Figure 2:
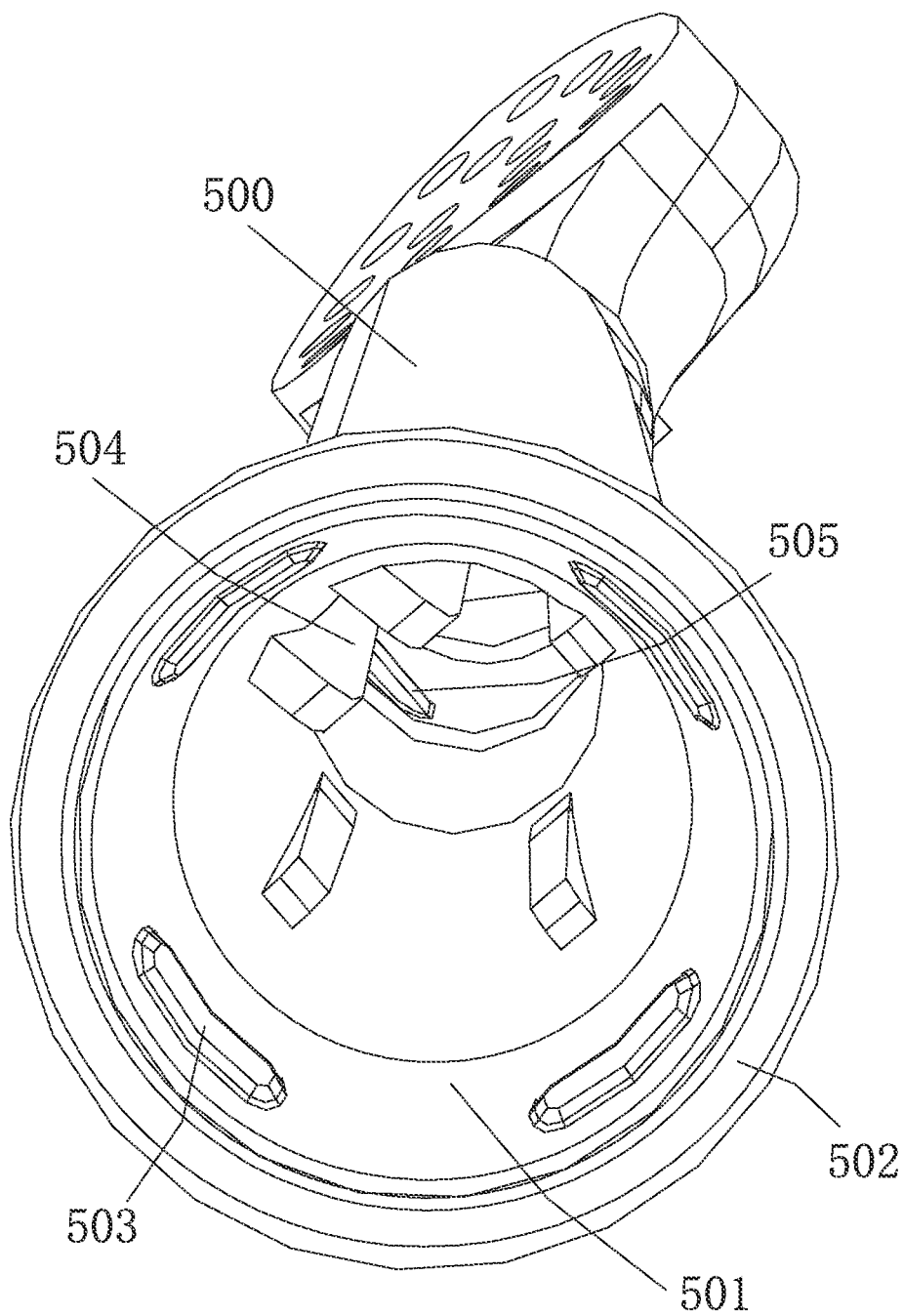
FIG. 2 is a perspective view showing a toothbrush body according to the present invention.
Figure 3:
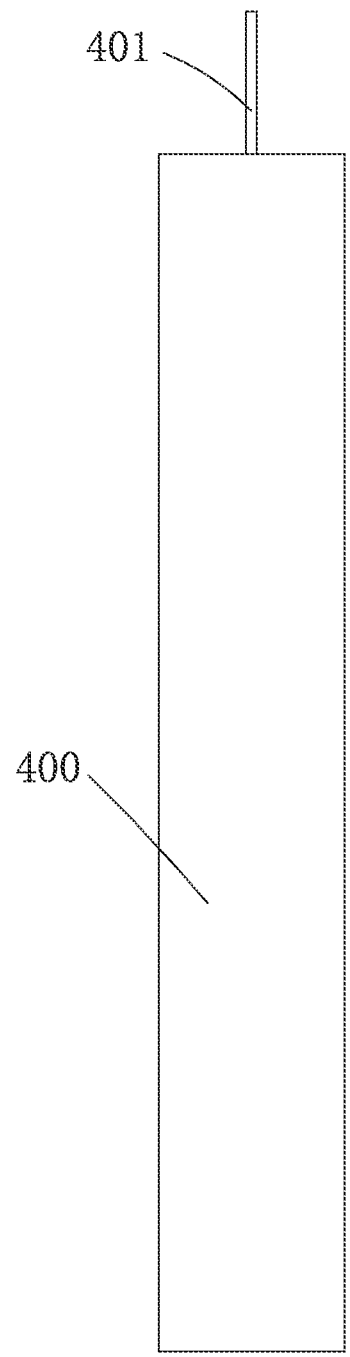
FIG. 3 is a perspective view showing a toothbrush handle according to the present invention.
Figure 4:
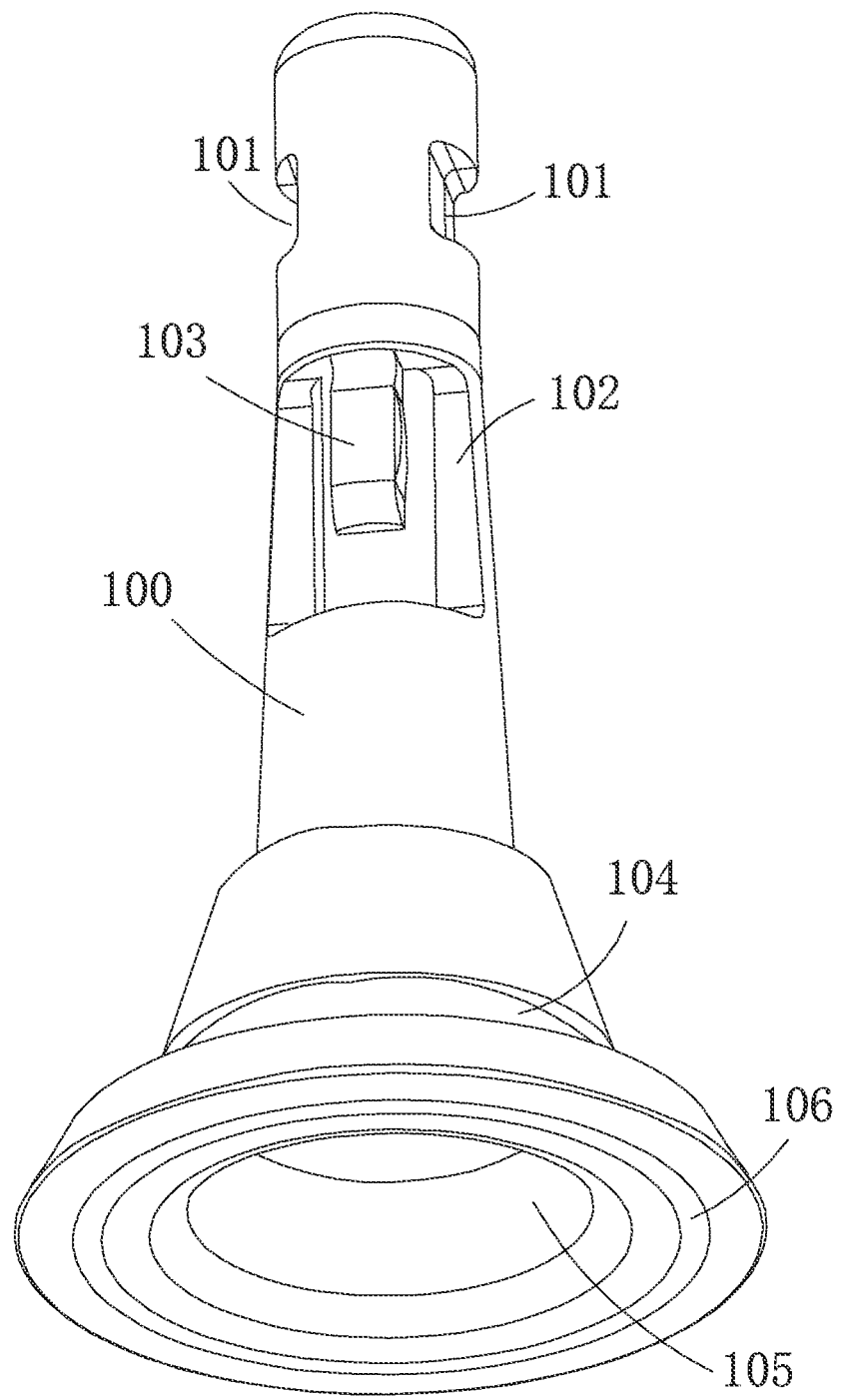
FIG. 4 is a perspective view showing an insertion piece according to the present invention.
Figure 5:
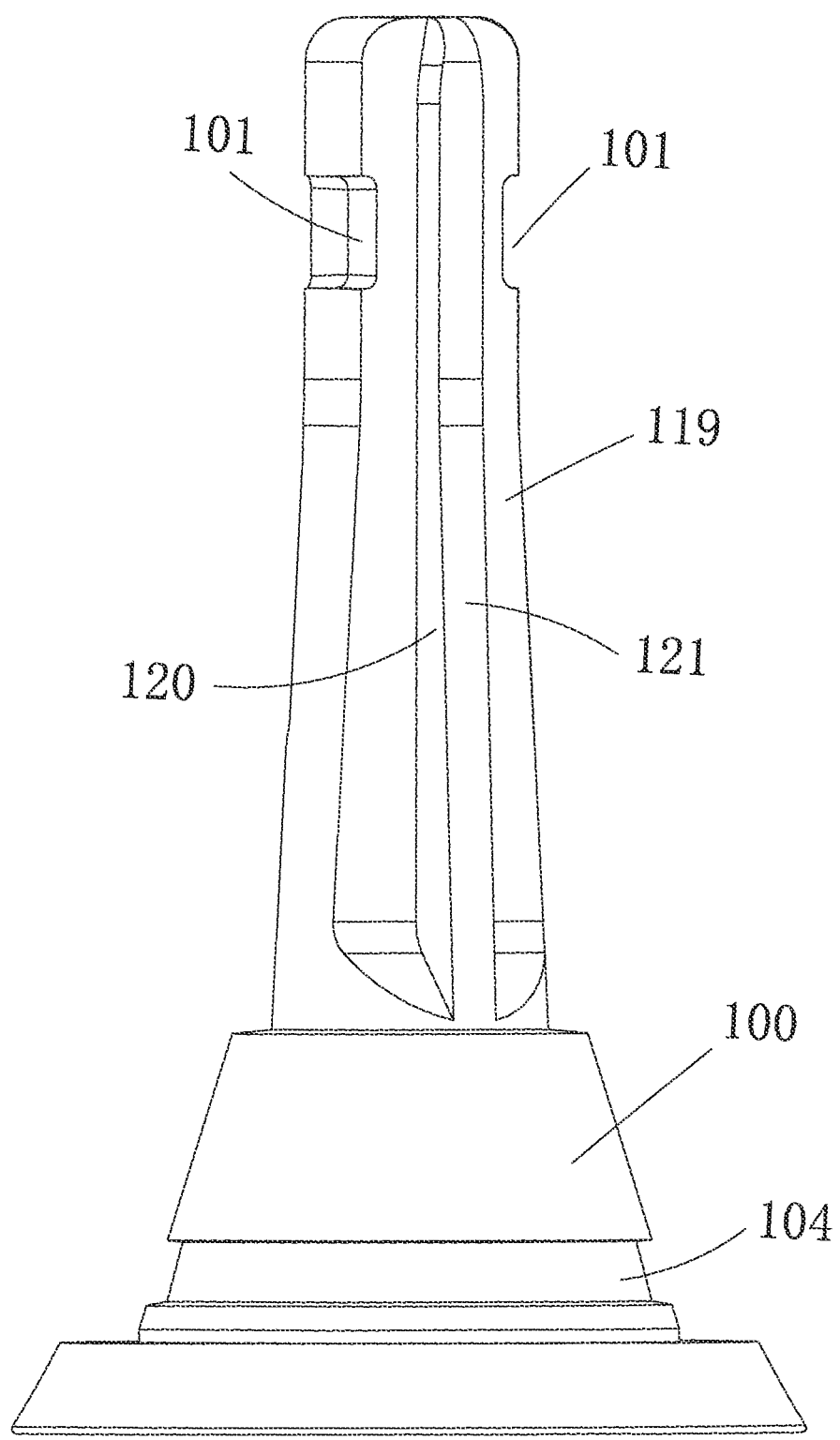
FIG. 5 is a perspective view showing an insertion piece according to the present invention.
Figure 6:
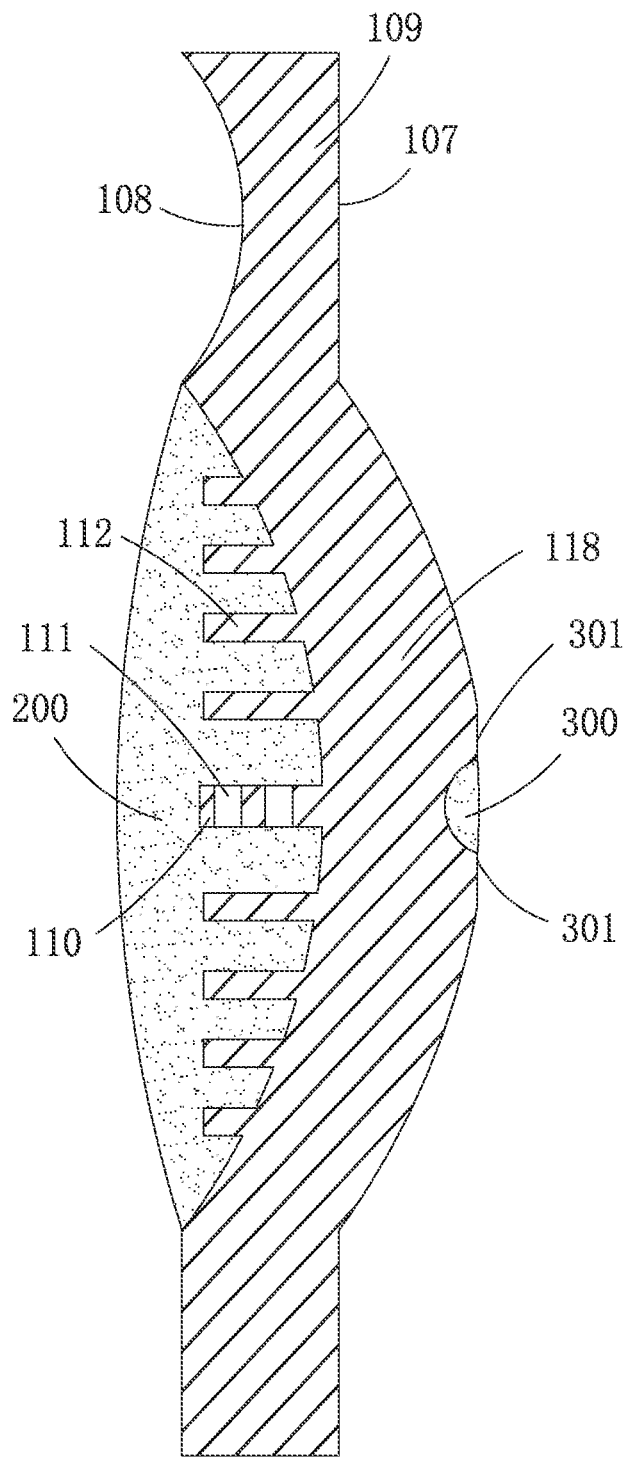
FIG. 6 is a cross-sectional view showing an elastic filler block according to the present invention in an uncompressed state.
Figure 7:
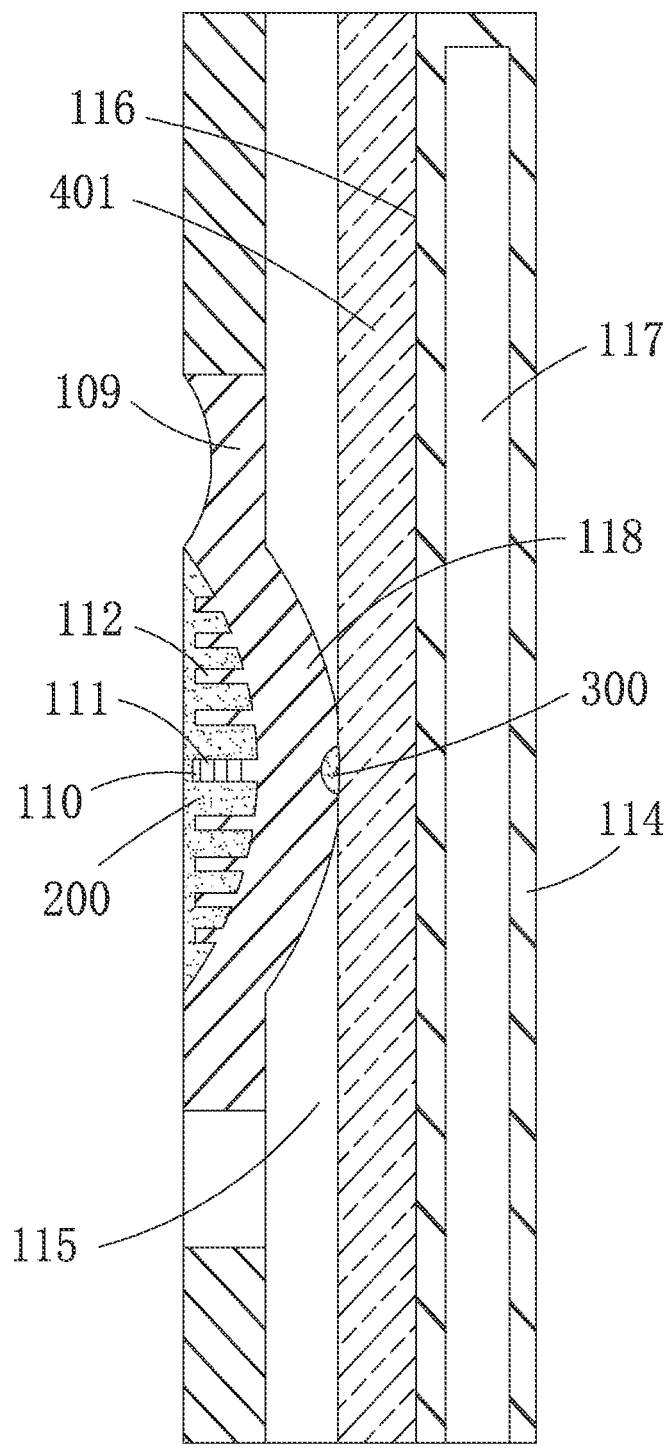
FIG. 7 is a cross-sectional view showing a vibration core in collaborative engagement with an elastic bar and a contact surface.

For better understanding of the purpose, technical solution, and advantages of the present invention, a more detailed description will be provided for the present invention, with reference to the attached drawings and embodiments thereof. It is noted that the specific embodiments described herein are provided only for illustration of the present invention and should not be construed to impose undue constraints to the present invention.

The detailed description of the present invention provided below refers only to specific embodiments thereof.

Identical or similar reference signs shown in the attached drawings refer to identical or similar parts of the embodiment. In the description of the present invention, it is noted that terms, such as "up", "down", "left", and "right", which are used to indicate a directional or positional relationship refer to a directional or positional relationship illustrated in the drawings and are used only for easy description of the present invention and simplifying the illustration, and are not indicate or suggest a specific device or component must take a specific direction or constructed and operated according to a specific direction. Thus, the terms that are used to describe the positional relationship in the drawings are only used for illustrative purposes and should not be construed as constraint to the patent. For those having ordinary skill in the art, the meaning of such terms can be understood according to specific context.

Referring to FIGS. 1-8, a preferred embodiment according to the present invention is provided.

The instant embodiment provides an electrical toothbrush head that is collaboratively combinable with a vibration core 401 of a toothbrush handle 400, and the electrical toothbrush head and the toothbrush handle 400 are combined together to form a complete electrical toothbrush.

The electrical toothbrush head that can be set in secure contact engagement with the vibration core comprises a toothbrush body 500. The toothbrush body 500 may have a shape that is determined according to practical needs and is not limited to any specific shape. The toothbrush body 500 is provided, in a lower part thereof, with an insertion compartment 501 that has a bottom opening. An insertion piece 100 is inserted through the bottom opening and disposed in the insertion compartment 501. The insertion piece 100 is provided, in a lower part thereof, with a core channel 115 into which the vibration core 401 that is made in a flat form is insertable. The insertion piece 100 is formed, in a bottom thereof, with an insertion opening in communication with the core channel 115. The insertion piece 100 is inserted through the bottom opening of the insertion compartment 501 into the insertion compartment 501 to be retained therein, and the vibration core 401 is inserted through the insertion opening into the core channel 115 to be retained therein.

The insertion piece 100 is provided in a sidewall thereof with a sideway slot 102. The sideway slot 102 penetrates to outside of the insertion piece 100 and the core channel 115. An elastic bar 103 that is integrally formed as one piece and elastically swingable is arranged in the sideway slot 102. The elastic bar 103 is arranged to extend in an axial direction of the core channel 115, and an upper end of the elastic bar 103 is fixedly connected to the sidewall of the insertion piece 100, while a lower end of the elastic bar 103 is arranged in a movable manner. In this way, when pressed by the vibration core 401, the elastic bar 103 may undergo elastic swinging by taking the upper end thereof as a swing position, and when the vibration core 401 is withdrawn from the core channel 115, under an action of elastic restoring force of the elastic bar 103, the elastic bar 103 resumes an original state.

The core channel 115 has an inner surface that forms a contact engagement surface 116 arranged to face the elastic bar 103. The contact engagement surface 116 extends regularly and smoothly in an axial direction of the core channel 115. The elastic bar 103 has a middle portion that bugles and curves toward the core channel 115 to form a curved section 118. A contact engagement spacing is present between the curved section 118 and the contact engagement surface 116. The contact engagement spacing is formed in the middle of the core channel 115, and the size of the contact engagement spacing is smaller than a thickness of the vibration core 401.

Due to the contact engagement spacing being smaller than the thickness of the vibration core 401, when the vibration core 401 is inserted through the contact engagement spacing, the elastic bar 103 swings away from the contact engagement surface 116 and induces a restoring force toward the contact engagement surface 116. The restoring force allows the curved section 118 to firmly and securely contact and engage with the vibration core 401.

The vibration core 401 includes two core side surfaces that are opposite to each other. When the vibration core 401 is inserted into the core channel 115 through the insertion opening of the insertion piece 100, the vibration core 401 extends through the contact engagement spacing to set the contact engagement surface 116 in contact and pressing engagement with one of the core side surfaces of the vibration core 401, through surface engagement therebetween, while another one of the core side surfaces of the vibration core 401 is in contact and pressing engagement with the curved section 118 and pushes the elastic bar 103 to elastically deform away from the contact engagement surface 116. The restoring force of the elastic bar 103 also drives the curved section 118 toward the contact engagement surface 116 to contact and engage with the vibration core 401. In this way, surface contact engagement between one of the core side surfaces of the vibration core 401 and the contact engagement surface 116 is made more secured and firmer.

An outside surface of the curved section 118 surrounds and defines a curved trough, and the curved trough, in the entirety thereof, is filled with a single piece, block-like, elastic filler block 200. The elastic filler block 200 contacts and presses an inside surface of the insertion compartment 501 and is in a compressed state. After the insertion piece 100 is inserted into the insertion compartment 501, the elastic filler block 200 is set in the compressed state. In this way, the elastic filler block 200 generates a restoring force toward the curved section 118, and the restoring force further drives the curved section 118 to more securely and more firmly contact and engage with the core side surface of the vibration core 401.

When electrical toothbrush head that can be set in secure contact engagement with the vibration core as described above is put into collaborative combination with the toothbrush handle 400, the vibration core 401 penetrates into the core channel 115, and the vibration core 401 is sandwiched between and clamped by the contact engagement surface 116 and the curved section 118. And, since the elastic bar 103 deforms and swings in an outward direction, the elastic filler block 200 gets compressed. As such, the restoring forces of the elastic filler block 200 and the elastic bar 103 drive the curved section 118 to elastically contact and press against the vibration core 401, achieving secured and firm contact engagement, allowing for elastic connection in cooperation with the high frequency vibration of the vibration core 401.

The curved trough is provided therein with a constraint plate 110 that is arranged horizontal. An inner end of the constraint plate 110 is fixedly connected to a middle of the outside surface of the curved section 118, and an outer end of the constraint plate 110 extends toward an inside surface of the insertion compartment 501, and forming a constraint spacing with respect to the inside surface of the insertion compartment 501. The elastic filler block 200 covers and encloses the entirety of the constraint plate 110.

The constraint plate 110 is arranged in the curved trough, and the constraint plate 110 is connected to the middle of the curved trough, so that the constraint plate 110 improves the bending strength of the curved section 118 and prevents the curved section 118 from deforming when the curved section 118 is being contacted and pressed. Further, the arrangement of the constraint plate 110 also helps to securely retain the elastic filler block 200 in the curved trough. Further, the constraint spacing formed between the constraint plate 110 and the inside surface of the insertion compartment 501 sets a constraint to a distance of elastically swinging of the elastic bar 103.

The constraint plate 110 divides the curved trough into two separation troughs that are respectively arranged at upper and lower sides. The elastic filler block 200 fills up both of the two separation troughs. The constraint plate 110 is formed with multiple penetration holes 111 that extend longitudinally through the constraint plate 110. The elastic filler block 200 fills up the multiple penetration holes 111. By means of the arrangement of the penetration holes 111 and the elastic filler block 200 filling up the penetration holes 111, portions of the elastic filler block 200 in the two separation troughs can be joined together as one piece, keeping the integrity of the elastic filler block 200 and achieving an effect of reinforcing the constraint plate 110 to further keep the bending strength of the curved section 118.

The separation troughs are each provided therein with multiple horizontal pillars 112 that are set horizontal. The multiple horizontal pillars 112 are sequentially arranged at intervals in an axial direction of the core channel 115. The horizontal pillars 112 have an inner end fixedly connected to the outside surface of the curved section 118, and the horizontal pillars 112 have an outer end extending toward the inside surface of the insertion compartment 501 and being arranged to be spaced from the inside surface of the insertion compartment 501. The elastic filler block 200 covers and encloses the multiple horizontal pillars 112.

The arrangement of the horizontal pillars 112 helps improve the bending strength of the entirety of the curved section 118, so that, together with the arrangement of the constraint plate 110, the bending strength of the entirety of the curved section 118 can be assured, so that the curved section 118, as being contacted and pressed by the vibration core 401 operating at a high frequency, is prevented from deforming to cause subsequent instability for contact engagement thereof.

In the instant embodiment, the curved section 118 has a curved side surface facing toward the contact engagement surface 116. A middle of the curved side surface is recessed in a direction away from the contact engagement surface 116 to form a recessed groove. An interior of the recessed groove is filled up with a silicone rubber body 300. The curved side surface includes two planar pressing surfaces 301. The two planar pressing surfaces 301 are respectively located on upper and lower sides of the recessed groove. The two planar pressing surfaces 301 are each arranged in a manner of being flush with an outside surface of the silicone rubber body 300. As such, when the vibration core 401 is inserted into the core channel 115, the two planar pressing surfaces 301 and the outside surface of the silicone rubber body 300 are each contacting and pressing against the core side surface of the vibration core 401 to increase the contacting and pressing surface area of the vibration core 401. Further, contacting and pressing conducted on the outside surface of the silicone rubber body 300 would improve the security and firmness of contact engagement.

The insertion piece 100 includes a projection plate 114. The projection plate 114 is arranged to extend in an axial direction of the core channel 115. The contact engagement surface 116 of the core channel 115 is formed on an inner side of the projection plate 114. The projection plate 114 is formed with a hollow cavity 117 that includes a bottom opening. The hollow cavity 117 is arranged to extend in the axial direction of the core channel 115. The hollow cavity 117 and the contact engagement surface 116 are arranged to separate from each other.

With the arrangement of the hollow cavity 117, the contact engagement surface 116, as being contacted and pressed by the vibration core 401, may be elastically deformable. Particularly, when the vibration core 401 is vibrating at a high frequency, the contact engagement surface 116 may get deformed in collaboration therewith. As such, all the three of the elastic filler block 200, the elastic bar 103, the contact engagement surface 116 are elastically deformable, this not only allowing the vibration core 401 to be securely disposed in the core channel 115, but also achieving elastic contact and pressing between the curved section 118 and the contact engagement surface 116 and the vibration core 401 when the vibration core 401 is vibrating at a high frequency, thereby preventing damage to the vibration core 401, and excessive abrasion of the curved section 118 and the contact engagement surface 116.

The elastic bar 103 includes, in an upper part, a deformable section 109. An upper end of the deformable section 109 is fixedly connected to a side wall of the insertion piece 100, and a lower end of the deformable section 109 is joined to the curved section 118. The deformable section 109 includes an inside surface 107 facing the core channel 115. The inside surface 107 of the deformable section 109 is a regular and smooth longitudinal surface. The deformable section 109 includes an outside surface 108 facing the inside surface of the insertion compartment 501. The outside surface 108 of the deformable section 109 is of a curved recess facing toward the core channel 115.

In this way, the elastic deformability of the deformable section 109 in a direction away from the contact engagement surface 116 is higher than the elastic deformability of the deformable section 109 in a direction toward the contact engagement surface 116, allowing the vibration core 401 to easily insert into the core channel 115 and penetrate through the contact engagement spacing.

The insertion piece 100 is provided, on an outside surface, with a planar section 119 in the form of a regular and smooth longitudinal surface. The planar section 119 and the contact engagement surface 116 are arranged opposite to each other. The planar section 119 is arranged to extend in the axial direction of the core channel 115. A rib 120 is formed on and raised from a middle portion of the planar section 119. The rib 120 is arranged to extend in the axial direction of the core channel 115 and spans over the entirety of the planar section 119.

Arranging the rib 120 on the planar section 119 helps improve the strength of the planar section 119 and also to limit deformation of the projection in the side thereof that is opposite to the contact engagement surface 116, so as to ensure individual elastic deformability of the contact engagement surface 116. Further, the insertion compartment 501 is also provided, in the interior thereof, with an insertion slot 504. In the collaborative combining of the insertion piece 100 and the insertion compartment 501, the rib 120 is fit into the insertion slot 504, so that connection between the middle of the insertion piece 100 and the toothbrush body 500 is made secured and firm.

Figure 8:
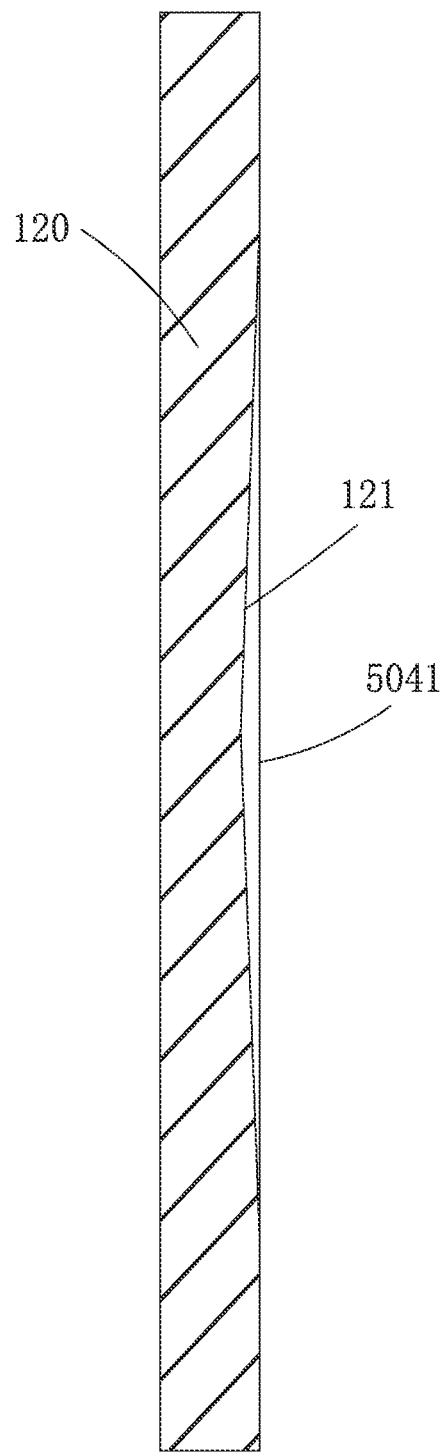
FIG. 8 is a partial cross-sectional view showing collaborative combination between a rib and an insertion slot according to the present invention.

Referring to FIG. 8, in the instant embodiment, the insertion slot 504 includes an insertion slot bottom wall 5041 facing the planar section 119, the rib 120 includes a rib wall 121 facing the bottom wall of the insertion slot 504. After the rib 120 is inserted into the insertion slot 504, the rib wall 121 and the insertion slot bottom wall 5041 are facing each other, and upper and lower ends of the rib wall 121 are separately in contact engagement with the insertion slot bottom wall 5041. A gap is present between a middle portion of the rib wall 121 and the insertion slot bottom wall 5041. In this way, due to the rib wall 121 and the insertion slot bottom wall 5041 including the gap therebetween, the collaborative combination of the rib 120 and the insertion slot 504 would include an elastic variation space. When the contact engagement surface 116 is contacted and pressed by the vibration core 401, the hollow cavity 117 of the projection plate 114 and the combination gap between the rib 120 and the insertion slot 504 both suit the need for elastic deformation of the contact engagement surface 116, achieving elastic contact engagement between contact engagement surface 116 and the vibration core 401.

The insertion piece 100 is provided, in an outside surface of an upper part thereof, with two retaining notches 101. The two retaining notches 101 are arranged opposite to each other. The retaining notches 101 have two ends horizontally extending through the insertion piece 100. The insertion compartment 501 is provided with two retaining blocks 505 raised from an inside surface thereof. The two retaining blocks 505 are respectively inserted into the retaining notches 101. The collaborative engagement between the retaining blocks 505 and the retaining notches 101 allows the upper part of the insertion piece 100 to be securely connected to the toothbrush body 500.

The insertion piece 100 is provided, in an outside surface of a lower part thereof, with a circumferential groove 104. The circumferential groove 104 is of a circumferential arrangement circling about the axial direction of the insertion piece 100. The insertion compartment 501 is provided with multiple engagement projections 503 raised from an inside surface thereof. The multiple engagement projections 503 are sequentially and circumferentially arranged at intervals. The multiple engagement projections 503 are insertable into the circumferential groove 104 to have the lower part of the insertion piece 100 securely connected to the toothbrush body 500.

As such, the collaborative combination between the retaining notches 101 and the retaining blocks 505 and the collaborative combination between the rib 120 and the insertion slot 504, as well as the combination between the circumferential groove 104 and the engagement projections 503 achieve retaining combination in upper, middle, and lower parts between the insertion piece 100 and the insertion compartment 501, ensuring secured disposition of the insertion piece 100 in the interior of the insertion compartment 501.

The insertion piece 100 is provided, on a bottom thereof, with a horizontally arranged annular end face. The annular end face is recessed upward to form a first annular area. The first annular area is circumferentially arranged in a circumferential direction of the annular end face. An upper magnetic attraction ring 106 is fit into the first annular area, and the upper magnetic attraction ring 106 is flush with the annular end face.

The toothbrush handle 400 的 is provided, on a top thereof, with a connecting end face that circumferentially surrounds a periphery of the vibration core 401 and is arranged horizontal and is recessed downward to form a second annular area. The second annular area is circumferentially arranged in a circumferential direction of the connecting end face. A lower magnetic attraction ring 502 is fit into the second annular area, and the lower magnetic attraction ring 502 is flush with the connecting end face.

When the vibration core 401 is inserted into the core channel 115, the annular end face and the connecting end face abut with each other in a top-down fashion. The upper magnetic attraction ring 106 and the lower magnetic attraction ring 502 magnetically attract and connect to each other in a top-down fashion. In this way, the electrical toothbrush head and the toothbrush handle 400 are collaboratively combinable and the magnetic attraction between the upper magnetic attraction ring 106 and the lower magnetic attraction ring 502 enables butting connection and surface engagement between the connecting end face and the annular end face, and the connection is secured and firm.

The above description provides only a preferred embodiment of the present invention and is not intended to limit the present invention. Any modification, equivalent substitute, and improvement that fall in the spirit and principle of the present invention are considered included in the scope of protection of the present invention defined in the appended claims.

What is claimed is:

1. An electrical toothbrush head for being in secure contact engagement with a vibration core, comprising a toothbrush body, the toothbrush body being provided, in a lower part thereof, with an insertion compartment that has a bottom opening, an insertion piece being inserted through the bottom opening and disposed in the insertion compartment, the insertion piece being provided, in a lower part thereof, with a core channel into which the vibration core in a flat form is insertable, the insertion piece being formed, in a bottom thereof, with an insertion opening in communication with the core channel;

the insertion piece being provided in a sidewall thereof with a sideway slot, the sideway slot penetrating to outside of the insertion piece and the core channel, an elastic bar that is integrally formed as one piece and elastically swingable being arranged in the sideway slot, the elastic bar being arranged to extend in an axial direction of the core channel, an upper end of the elastic bar being fixedly connected to the sidewall of the insertion piece, a lower end of the elastic bar being arranged in a movable manner;

the core channel having an inner surface that forms a contact engagement surface arranged to face the elastic bar, the contact engagement surface extending smoothly in the axial direction of the core channel, the elastic bar having a middle portion that bulges and curves toward the core channel to form a curved section, a contact engagement spacing being present between the curved section and the contact engagement surface, the contact engagement spacing being formed in a middle of the core channel, the contact engagement spacing being smaller than a thickness of the vibration core when the elastic bar is in an original state;

the vibration core including two core side surfaces that are opposite to each other, such that when the vibration core is inserted into the core channel through the insertion opening of the insertion piece, the vibration core extends through the contact engagement spacing to set the contact engagement surface in contact and pressing engagement with one of the core side surfaces of the vibration core, through surface engagement therebetween, another one of the core side surfaces of the vibration core being in contact and pressing engagement with the curved section and pushing the elastic bar to elastically deform away from the contact engagement surface; and an outside surface of the curved section surrounding and defining a curved trough, the curved trough being completely filled with a single-piece elastic filler block, the elastic filler block contacting and pressing an inside surface of the insertion compartment and being in a compressed state.

2. The electrical toothbrush head for being in secure contact engagement with the vibration core according to claim 1, wherein the curved trough is provided therein with a constraint plate that is arranged horizontal, an inner end of the constraint plate being fixedly connected to a middle of the outside surface of the curved section, an outer end of the constraint plate extending toward an inside surface of the insertion compartment and forming a constraint spacing with respect to the inside surface of the insertion compartment, the elastic filler block covering and enclosing entirety of the constraint plate.

3. The electrical toothbrush head for being in secure contact engagement with the vibration core according to claim 2, wherein the constraint plate divides the curved trough into two separation troughs that are respectively arranged at upper and lower sides, the elastic filler block filling up both of the two separation troughs, the constraint plate being formed with multiple penetration holes that extend longitudinally through the constraint plate, the elastic filler block filling up the multiple penetration holes.

4. The electrical toothbrush head for being in secure contact engagement with the vibration core according to claim 3, wherein the separation troughs are provided therein with multiple horizontal pillars that are set horizontal, the multiple horizontal pillars being sequentially arranged at intervals in the axial direction of the core channel; the horizontal pillars each having an inner ends fixedly connected to the outside surface of the curved section, the horizontal pillars each having an outer end extending toward the inside surface of the insertion compartment and being arranged to be spaced from the inside surface of the insertion compartment, the elastic filler block covering and enclosing the multiple horizontal pillars.

5. The electrical toothbrush head for being in secure contact engagement with the vibration core according to claim 1, wherein the curved section has a curved side surface facing toward the contact engagement surface, a middle of the curved side surface being recessed in a direction away from the contact engagement surface to form a recessed groove, an interior of the recessed groove being filled up with a silicone rubber body; the curved side surface includes two planar pressing surfaces, the two planar pressing surfaces being respectively located on upper and lower sides of the recessed groove, the two planar pressing surfaces being each arranged in a manner of being flush with an outside surface of the silicone rubber body, when the vibration core is inserted into the core channel, the two planar pressing surfaces and the outside surface of the silicone rubber body are each contacting and pressing against the core side surface of the vibration core.

6. The electrical toothbrush head for being in secure contact engagement with the vibration core according to claim 1, wherein the insertion piece includes a projection plate, the projection plate being arranged to extend in the axial direction of the core channel, the contact engagement surface of the core channel being formed on an inner side of the projection plate, the projection plate being formed with a hollow cavity that includes a bottom opening, the hollow cavity being arranged to extend in the axial direction of the core channel, the hollow cavity and the contact engagement surface being arranged to separate from each other.

7. The electrical toothbrush head for being in secure contact engagement with the vibration core according to claim 1, wherein the elastic bar includes, in an upper part, a deformable section, an upper end of the deformable section being fixedly connected to a side wall of the insertion piece, a lower end of the deformable section being joined to the curved section; the deformable section includes an inside surface facing the core channel, the inside surface of the deformable section being a regular and smooth longitudinal surface, the deformable section including an outside surface facing the inside surface of the insertion compartment, the outside surface of the deformable section being of a curved recess facing toward the core channel.

8. The electrical toothbrush head for being in secure contact engagement with the vibration core according to claim 1, wherein the insertion piece is provided, on an outside surface, with a planar section in the form of a regular and smooth longitudinal surface, the planar section and the contact engagement surface being arranged opposite to each other, the planar section being arranged to extend in the axial direction of the core channel, a rib being formed on and raised from a middle portion of the planar section, the rib being arranged to extend in the axial direction of the core channel and spanning over entirety of the planar section.

9. The electrical toothbrush head for being in secure contact engagement with the vibration core according to claim 1, wherein the insertion piece is provided, in an outside surface of an upper part thereof, with two retaining notches, the two retaining notches being arranged opposite to each other, the retaining notches having two ends horizontally extending through the insertion piece, the insertion compartment being provided with two retaining blocks raised from an inside surface thereof, the two retaining blocks being respectively insertable into the retaining notches.

10. The electrical toothbrush head for being in secure contact engagement with the vibration core according to claim 1, wherein the insertion piece is provided, in an outside surface of a lower part thereof, with a circumferential groove, the circumferential groove being of a circumferential arrangement circling about an axial direction of the insertion piece, the insertion compartment being provided with multiple engagement projections raised from an inside surface thereof, the multiple engagement projections being sequentially and circumferentially arranged at intervals, the multiple engagement projections being insertable into the circumferential groove.

* * * * *